United States Patent [19]
Liebmann et al.

[11] 3,827,193
[45] Aug. 6, 1974

[54] SYSTEM FOR BALANCING ROTARY BODIES

[75] Inventors: Werner Liebmann, Dortmund-Applerbeck; Lothar Kuhrau, Troisdorf-Friedrich-Wilhelms-Hutte, both of Germany

[73] Assignee: Schneider Maschinenbau GmbH, Siegburg, Rheinland, Germany

[22] Filed: Sept. 15, 1972

[21] Appl. No.: 289,290

[30] Foreign Application Priority Data
Sept. 30, 1971 Germany............................ 2148832

[52] U.S. Cl.................................. 51/169, 74/573
[51] Int. Cl............................................ B24b 45/00
[58] Field of Search....................... 51/169; 74/573

[56] References Cited
UNITED STATES PATENTS

| | | | |
|---|---|---|---|
| 2,241,637 | 5/1941 | Ernest | 51/169 X |
| 2,915,918 | 12/1959 | Comstock | 74/573 |
| 3,107,550 | 10/1963 | Backer | 51/169 X |
| 3,371,450 | 3/1968 | Board | 51/169 |
| 3,376,759 | 4/1968 | Held | 74/573 |
| 3,581,596 | 6/1971 | Wespi | 74/573 |
| 3,698,263 | 10/1972 | Ito | 51/169 X |
| 3,702,082 | 11/1972 | Decker | 51/169 X |

*Primary Examiner*—Donald G. Kelly
*Attorney, Agent, or Firm*—Karl F. Ross; Herbert Dubno

[57] ABSTRACT

A system for balancing rotary bodies, such as a grinding wheel, comprises a pair of semi-cylindrical segmental balancing weights of segmental configuration individually rotatable about the axis of the rotatable body to be balanced by a respective electric motor. A brush and slipring arrangement is provided for enabling the individual reduction-gear motors to be operated while the body is rotated.

13 Claims, 3 Drawing Figures

SYSTEM FOR BALANCING ROTARY BODIES

FIELD OF THE INVENTION

The present invention relates to a system for the balancing of rotatable bodies using counterbalancing weights or the like having centers of gravity offset from the rotation center or axis of the body and shiftable so that the resultant imbalancing force vector has an amplitude of zero and an origin coinciding with the center of rotation.

BACKGROUND OF THE INVENTION

In the balancing of grinding wheels and the like, mounted upon a rotatable arbor or mandrel, it is common practice to position balancing weights at locations diametrically opposite the imbalance center of the wheel so that a resultant imbalance is nullified by positioning the center of gravity of the entire system, (i.e. the wheel, the arbor and the balancing arrangement) at the center of the rotation of this arbor and wheel. The term "imbalance" or "unbalance" as used herein, is intended to refer to the circumstance which arises when the center of gravity of a rotatable body, such as a grinding wheel, is offset to a greater or lesser extent from its center of rotation. Such imbalance imparts an imbalance-force vector to the system and creates a "throw" which may destroy the wheel, the system mounting the wheel on the arbor, the arbor or the arbor bearings. This imbalance can be nullified by removing mass from the wheel, although this is generally impractical, or by adding mass to the system at locations such that the center of gravity of the entire system will be moved closer to the center or rotation.

It has been proposed to provide balancing arrangements which are adjustably mounted on the arbor, mandrel or shaft of the rotatable body and can be shifted in a radial, angular or composite direction by a mechanical drive system to balance a wheel carried thereby. Not only are such mechanical arrangements relatively complex, difficult to operate and expensive to maintain, especially in abrasive environments, but they are also of limited versatility. Frequently it is difficult, if not impossible, to provide such a mechanical adjustment system in a limited space within a rotatable body such as a grinding wheel, or it is necessary to provide a large wheel for an adjusting system of large volume.

OBJECTS OF THE INVENTION

It is the principal object of the present invention to provide a low-cost system for the balancing of rotatable bodies whereby the aforementioned disadvantages are obviated and balancing of grinding wheels and like bodies can be accomplished with a mechanism of small size, little tendency toward breakdown, high useful life and a wide range of counterbalancing capabilities.

It is another object of the invention to provide an improved system for the balancing of rotatable bodies which can accomplish this task over a shorter period than prior-art systems.

Still another object of the invention is the provision of a low-cost wheel-balancing arrangement which can prevent vibration and oscillation, is highly compact, is of simple construction with a minimum of parts, is free from a tendency toward contamination, is adjustable manually or automatically from a location external of the system, and can be operated while the rotatable body is in motion.

SUMMARY OF THE INVENTION

A wheel-balancing system, according to the present invention, for the balancing of grinding wheels or other rotatable bodies which may include an annular structure mounted on an arbor, shaft or hub, comprises a pair of angularly displaceable balancing wheels preferably located in the plane of the center of gravity of the rotatable body which is perpendicular to the axis of rotation thereof or having a resultant center of gravity located in this plane, and individual reduction-gear electric motors operatively connected to the weights for angularly displacing same and thereby shifting their centers of gravity so that the resultant center of the balancing weights may lie diametrically opposite the actual center of gravity of an unbalanced rotatable body so that the entire system has a center of gravity lying precisely at the center of rotation.

According to an important feature of the present invention, the rotatable body is a grinding wheel mounted upon a spindle and the balancing device is received within this spindle, in a guide sleeve for the angularly displaceable weight which may be of cylindrical segmental configuration so that the weight extends over at most 180° of the angular displacement path. When the counterweights are identical, they each extend over 180° of this path so that their net or resultant center of gravity can be located at any point around the axis of rotation of the body. The individual electric motors, which may be of the low-power, reduction-gearing type capable of output speeds up to, say, 1 rpm, are relatively small and can be received within the respective guide sleeves of the arbor or spindle, preferably along the axis thereof. The electric motors are individually and separately energizable although it has been found to be advantageous, from time to time, to provide a common drive circuit for both motors. The output shafts of the two motors may extend toward one another and can be provided with pinions meshing with internal gears carried by the weighted segments which can describe paths surrounding the respective motors. In other words, each of the weights is coaxially nested with the respective motor and each motor extends coaxially within the guide sleeve for the respective weight.

This individual motor drive for each of the weights substantially reduces the number of parts of the adjusting mechanism and, where both motors are identical in performance characteristics, they may be operated simultaneously in opposite senses to displace the balancing weights angularly symetrically in opposite senses to cause the resultant center of gravity (common center of gravity) to shift radially along an axial plane which can coincide with the axial plane of the center of gravity of the imbalanced wheel. This system has the advantage that the balancing operation does not produce any migration of the resultant center of gravity of the balancing weights from the axial plane in which it has previously been determined the center of gravity of the rotatable body lies. Of course, by individually operating the electric motors, the appropriate axial plane of the imbalance can be determined. The motors may be direct-current motors, alternating-current motors or rotary-field motors as may be desired.

The transmission between the output shaft of each motor and the respective angularly displaceable imbalance weight should be made as short as possible and, to this end, it is preferred to have the balancing weight closely surround the respective electromotor and provide a relatively large pinion upon the output shaft of each motor for engagement with the internal gear of the weight. The axial length of the entire balancing system, consisting of motors and cylindrically segmental weights should not project axially beyond the rotatable body to any significant extent and is preferably housed along the axis of rotation thereof. When both of the motor weight assemblies are provided in axial alignment within the rotatable body, the resultant center of gravity may also lie in the radial plane of the system containing the center of gravity of the rotatable body. However, some relative axial displaceability of the balancing system in the unbalanced wheel is desirable to ensure that the centers of gravity of the balancing system and the unbalanced wheel lie in a common plane perpendicular to the axis of the spindle.

When each of the weights is a cylindrical segment extending over 180°, the actual centers of gravities of the weights can be disposed diametrically opposite one another and, if the centers of gravity of the motors are similarly disposed diametrically opposite one another in a common axial plane, the balancing system can be readily brought to a distributed-weight condition. The latter condition is used when the wheel has previously been balanced and balancing upon the spindle is not necessary.

According to yet another feature of the invention, an end of the spindle is provided with a slipring arrangement which cooperates with the brushes of a brush holder for connecting the motors in a wheel-balancing circuit. In this case, the motors may be operated while the grinding wheel is rotated.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
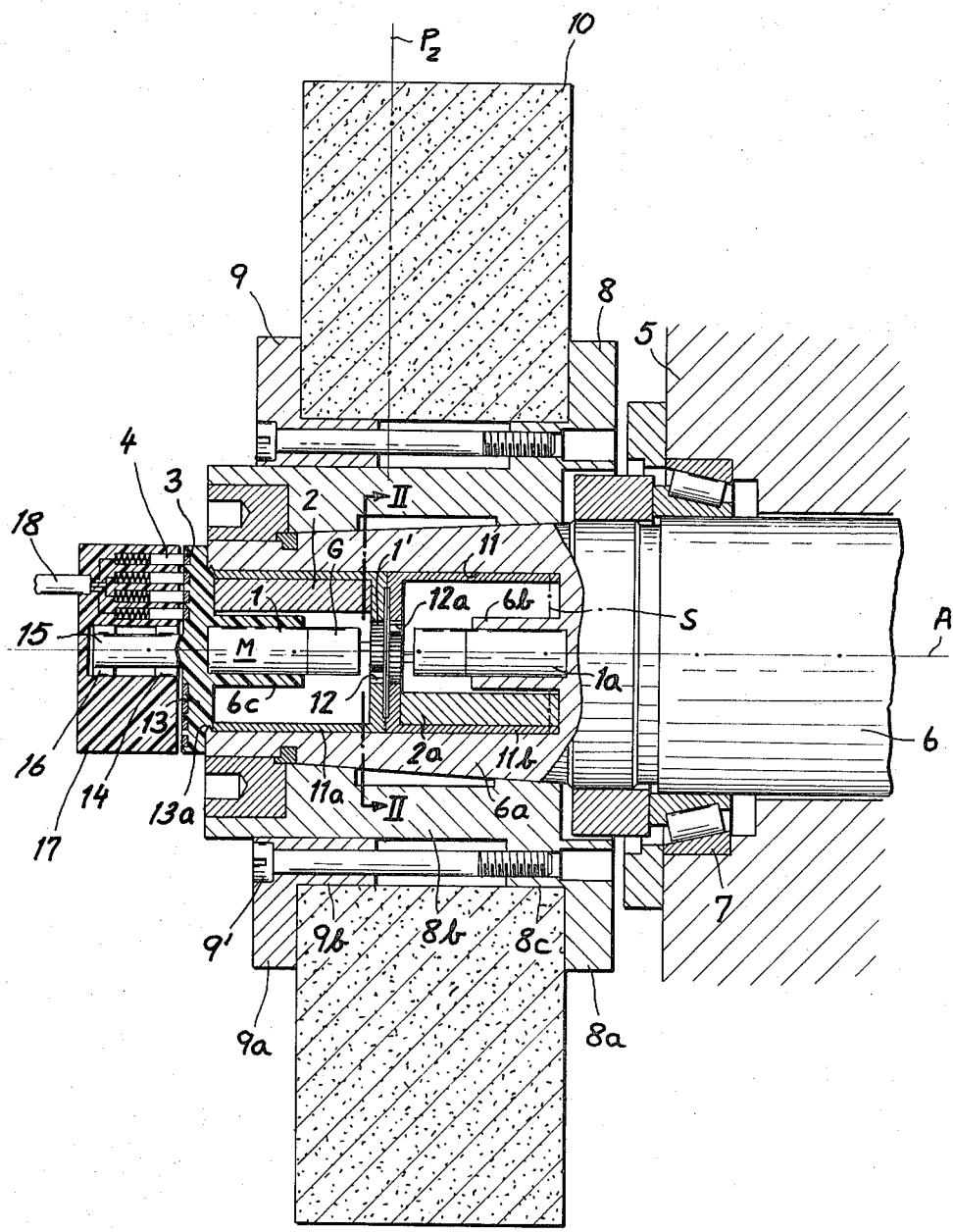
FIG. 1 is an axial cross-sectional view through an assembly embodying the present invention.
Figure 2:
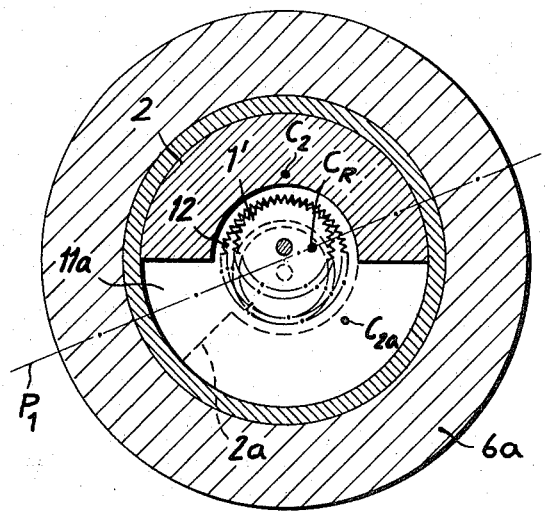
FIG. 2 is a cross-sectional view taken along the line II — II of FIG. 1.

In FIGS. 1 and 2, there has been shown a grinding-wheel balancing arrangement by way of example, in which the machine housing 5 carries the grinding wheel spindle, mandrel or arbor 6, in a roller bearing 7. A pair of flange disks 8 and 9 clamp the grinding wheel 10 between them, the grinding wheel 10 having the form of an annulus. The flange disks 8 and 9 comprise annular flanges 8a and 9a between the opposite flanks of the grinding wheel 10 are clamped by drawing bolts 9' traversing the flange 9 and threaded into the flange 8. Member 8 also has a cylindrical portion 8b which is internally tapered to fit onto the tapered portion 6a of the arbor and a step 8c which, together with the step 9b of the other flange disk, fits into the grinding wheel 10.

The spindle 6 is provided with an axially extending bore 11 into which a pair of cup-shaped guide sleeves 11a and 11b are rotatably inserted, these sleeves carrying cylindrical segmental balancing weights 1 and 2a respectively. The weights 2 and 2a have centers of gravity which are offset from the axis of rotation of the system which is represented at A.

The weight 2 is provided at its inner axial end with a ring gear of the internal toothed type as represented at 12, meshing with the pinion 1' of a reducing-gear electric motor 1. The motor 1 comprises the motor body M and a speed-reducing gear housing G and may be of the reversible direct-current type. Similarly, the motor 1a carries a pinion which meshes with the internal gear 12a of the weight 2a.

The electric motors 1 and 1a are nonrotatably received in a boss 6b of the spindle and in a boss 6c formed in a fitting 13 anchored to the spindle by press-fit, screw threads or the like. A simple single turn thread may be provided at 13a for this purpose.

The fitting 13, forming a head for the spindle, comprises a stub 15 upon which a brush holder 17 is mounted via needle bearings 14 and 16. The brush holder may be stationary and can be carried by a support not shown.

The brush holder 17 is provided with four brushes 4, which are electrically insulated from one another and the brush holder, and which bear upon respective concentric sleeve rings 3. For this purpose, the brushes 4 are arranged with spacing in the radial direction. An electric cable 18 connects the brushes 4 to the control circuit.

The center of gravity of the weight 2a is located substantially at $C_{2a}$ while the center of gravity of the weight 2 is located at $C_2$ (FIG. 2) so that the resultant center of gravity is substantially located at $C_R$. When the two weights are swung away from one another by energization of the respective motors symmetrically with respect to the plane $P_1$, the center of gravity $C_R$ will shift radially along this plane. Of course, this type of balancing is suitable only when the center of imbalance of the wheel is located in this axial plane. To position the resultant center of gravity in the proper axial plane, we may energize both motors in the same sense, both motors in opposite senses to different degrees, or one of the adjusting motors as is desired. We prefer, moreover, to locate the resultant center of gravity in the radial plane $P_2$ of the center of imbalance of the entire wheel-support system including the wheel. If it is necessary to adjust the resultant center of gravity $C_R$ in the axial direction, shims may be provided at S and the axial length of the weights reduced correspondingly. Other means may be used, if desired, to axially shift the weights within the shaft.

Figure 3:
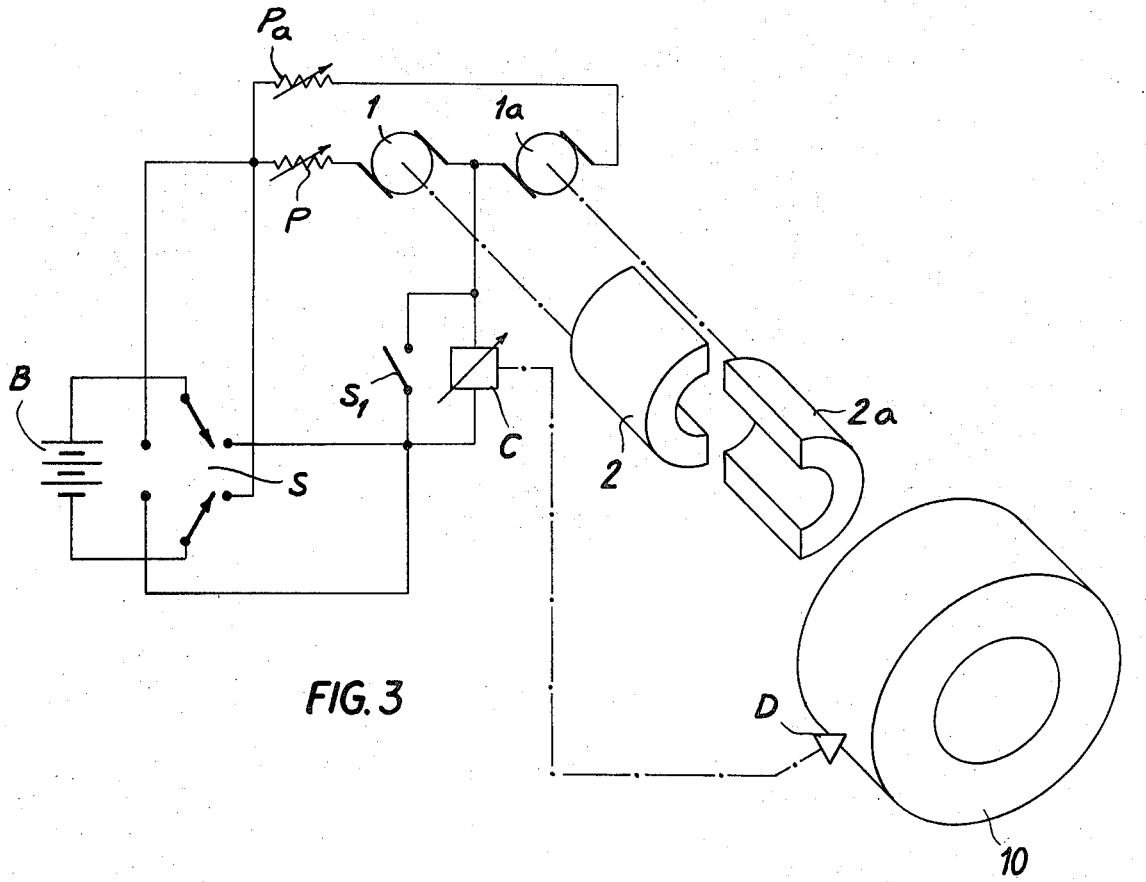
FIG. 3 is a diagram illustrating the energization of the system of FIGS. 1 and 2.

In FIG. 3, there is shown a circuit in which the motors 1 and 1a driving the eccentric gears 2 and 2a, each of which extend over a cylindrical segmental arc of 180°, are energized by the direct current source B by a reversing switch S and an automatic control C cooperating with a detector D of the oscillations of the unbalanced wheel 10. As the imbalance is detected at D, the motors 1 and 1a may be simultaneously energized to restore balance in the manner described. In order to enable the motors to operate individually, a switch $S_1$ can shunt the control C so that the individual potentiometers P and $P_a$ are effective to control the rate and degree of individual movement of the weights.

We claim:

1. A balanceable rotatable assembly comprising a rotatable body including a shaft rotatable about an axis and having a center of gravity offset therefrom, a pair of rotatable balancing weights angularly displaceable about said axis and having respective centers of gravity offset therefrom, and individual electric motors in said body connected to said balancing weights for angularly displacing them individually, said motors and said weights being mutually adjacent and being axially aligned within said body.

2. The assembly defined in claim 1 wherein said motors are identical low-speed motors.

3. The assembly defined in claim 1 wherein said motors are each provided with a speed-reducing gearing.

4. The assembly defined in claim 1 wherein said motors are each in part embraced by the respective balancing weight.

5. The assembly defined in claim 1 wherein said shaft is hollow and said weights and motors are received in said shaft.

6. The assembly defined in claim 5 wherein said shaft is provided with sliprings, said assembly further comprising brushes engaging said sliprings and connectable for an electric circuit for energizing said motors.

7. The assembly defined in claim 1 wherein said weights are semicylindrical segments.

8. A balanceable rotatable assembly comprising a rotatable body including a shaft rotatable about an axis and having a center of gravity offset therefrom, a pair of rotatable balancing weights angularly displaceable about said axis and having respective centers of gravity offset therefrom, and individual electric motors in said body connected to said balancing weights for angularly displacing them individually, said motors being each in part embraced by the respective balancing weight.

9. The assembly defined in claim 8 wherein said motors are each disposed immediately adjacent the respective balancing weights.

10. A balanceable rotatable assembly comprising a rotatable body including a shaft rotatable about an axis and having a center of gravity offset therefrom, a pair of rotatable balancing weights angularly displaceable about said axis and having respective centers of gravity offset therefrom, and individual electric motors in said body connected to said balancing weights for angularly displacing them individually, said shaft being hollow and said weights and motors being received in said shaft.

11. The assembly defined in claim 10 wherein said shaft is provided with sliprings, said assembly fuurther comprising brushes engaging said sliprings and connectable for an electric circuit for energizing said motors.

12. A balanceable rotatable assembly comprising a rotatable body including shaft rotatable about an axis and having a center of gravity offset therefrom, a pair of rotatable balancing weights angularly displaceable about said axis and having respective centers of gravity offset therefrom, and individual electric motors in said body connected to said balancing weights for angularly displacing them individually, said weights being semicylindrical segments.

13. A balanceable rotatable assembly comprising a rotatable body including a shaft rotatable about an axis and having a center of gravity offset therefrom, a pair of rotatable balancing weights angularly displaceable about said axis and having respective centers of gravity offset therefrom, and individual electric motors in said body connected to said balancing weights for angularly displacing them individually, said shaft being formed with an axially extending cylindrical bore and carrying a grinding wheel forming said body therewith, each of said weights being a semicylindrical arc segment received in said bore in axially adjacent relationship and rotatable individually about the axis of said shaft, each of said weights comprising an internal gear, said motors being received within the respective weights coaxial therewith and having a pinion meshing with the respective internal gear, each of said motors comprising a motor body fixed against rotation relative to said shaft and a speed-reducing gearing between said motor body and the respective pinion, and said shaft being provided with at least three concentric sliprings electrically connected to said motor bodies and formed along an end face of said shaft, said assembly further comprising a brush holder journaled with respect to said shaft and having a radial array of brushes slidably engaging said sliprings for connecting said motors in an electrical circuit.

* * * * *